(12) United States Patent
Rittershofer

(10) Patent No.: US 7,779,820 B2
(45) Date of Patent: Aug. 24, 2010

(54) LIQUID SEPARATOR

(75) Inventor: Frank U. Rittershofer, Karlsruhe (DE)

(73) Assignee: TI Group Automotive Systems, L.L.C., Warren, MI (US)

( * ) Notice: Subject to any disclaimer, the term of this patent is extended or adjusted under 35 U.S.C. 154(b) by 432 days.

(21) Appl. No.: 11/829,623

(22) Filed: Jul. 27, 2007

(65) Prior Publication Data

US 2009/0025822 A1    Jan. 29, 2009

(51) Int. Cl.
*F02M 37/20* (2006.01)
*F02M 33/02* (2006.01)

(52) U.S. Cl. ...................... 123/516; 123/518

(58) Field of Classification Search ............... 123/516, 123/510, 511, 514, 518, 519, 573; 141/302, 141/312, 44; 137/587, 588, 590, 591, 592; 55/418
See application file for complete search history.

(56) References Cited

U.S. PATENT DOCUMENTS

| | | | | | |
|---|---|---|---|---|---|
| 3,699,938 | A | * | 10/1972 | Frazier | 123/557 |
| 3,917,109 | A | * | 11/1975 | MacDonald | 220/746 |
| 4,854,469 | A | * | 8/1989 | Hargest | 220/374 |
| 4,963,169 | A | * | 10/1990 | Granville | 96/178 |
| 5,033,517 | A | * | 7/1991 | Bucci | 141/59 |
| 5,215,132 | A | * | 6/1993 | Kobayashi | 141/302 |
| 5,722,374 | A | * | 3/1998 | Kidokoro et al. | 123/516 |
| 5,740,842 | A | * | 4/1998 | Maier et al. | 141/45 |
| 5,944,044 | A | * | 8/1999 | King et al. | 137/202 |
| 5,947,153 | A | * | 9/1999 | Bucci et al. | 137/588 |
| 6,312,488 | B1 | * | 11/2001 | Fischer | 55/315 |
| 6,318,398 | B1 | * | 11/2001 | Ehrman et al. | 137/43 |
| 6,405,747 | B1 | * | 6/2002 | King et al. | 137/202 |
| 6,532,983 | B2 | * | 3/2003 | Ganachaud | 137/43 |
| 6,557,581 | B2 | * | 5/2003 | Ehrman et al. | 137/587 |
| 6,578,597 | B2 | * | 6/2003 | Groom et al. | 137/43 |
| 6,723,149 | B2 | * | 4/2004 | Ernst et al. | 55/498 |
| 6,860,285 | B2 | * | 3/2005 | Ehrman et al. | 137/38 |
| 6,871,662 | B2 | * | 3/2005 | Duermeier et al. | 137/43 |

FOREIGN PATENT DOCUMENTS

KR    1020080073262    8/2008

OTHER PUBLICATIONS

Written Opinion & International Search Report for PCT/US08/70633 Jan. 12, 2009, 8 pages.

* cited by examiner

*Primary Examiner*—Thomas N Moulis
(74) *Attorney, Agent, or Firm*—Reising Ethington P.C.

(57) ABSTRACT

A liquid separator that can be used in a vehicle fuel system can have, among other components, an inlet portion, a deflector surface, and an outlet portion. The inlet portion can receive fluid from a fluid tube that communicates with a fuel tank. The deflector surface may cause a change-in-direction that separates liquid and fuel vapor from the fluid. The outlet portion can carry separated fuel vapor to a vapor tube that communicates with a canister. A space adjacent the inlet portion can be defined by a fuel system component such as partly by a fill tube or by a vessel.

20 Claims, 2 Drawing Sheets

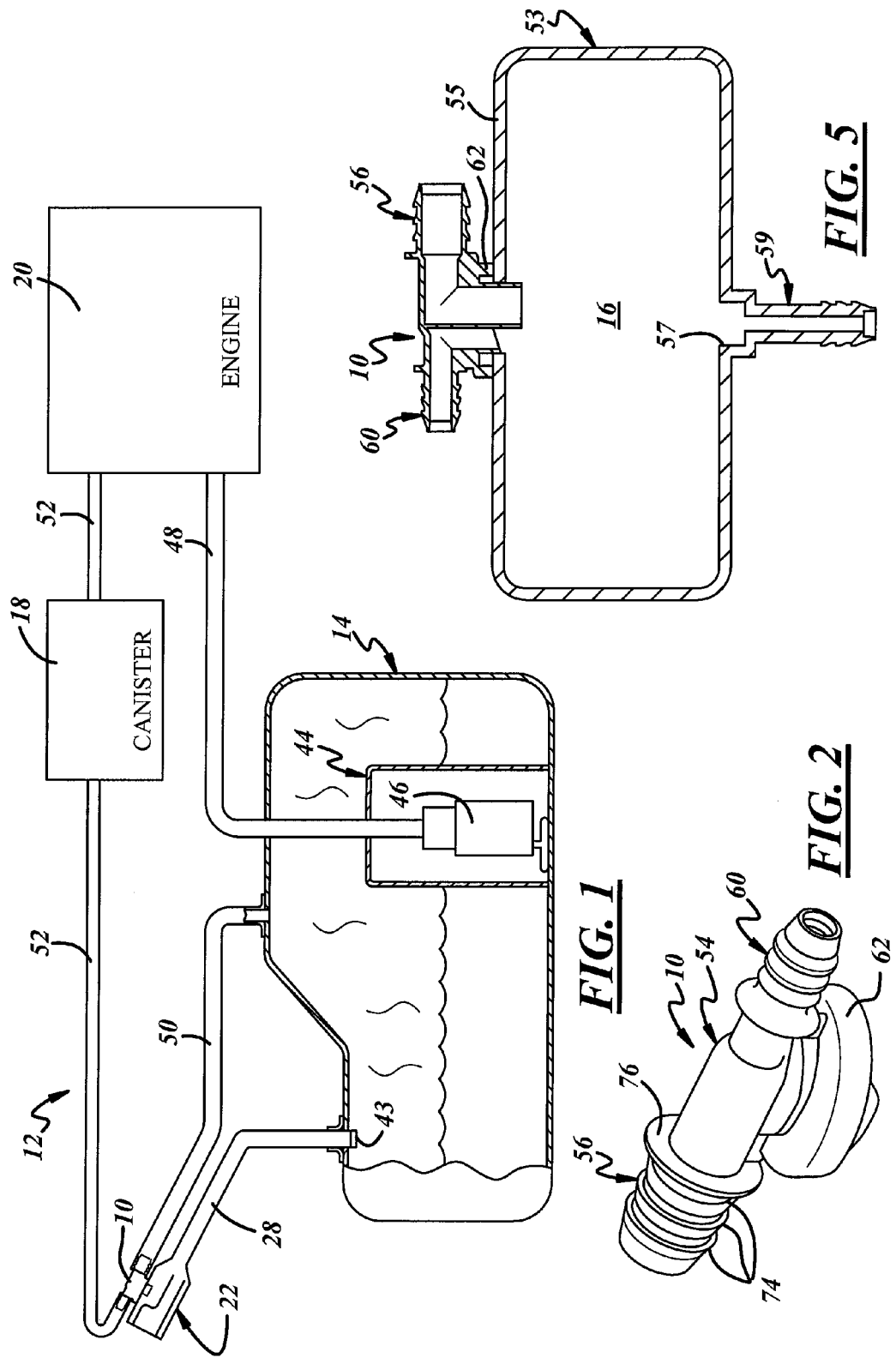

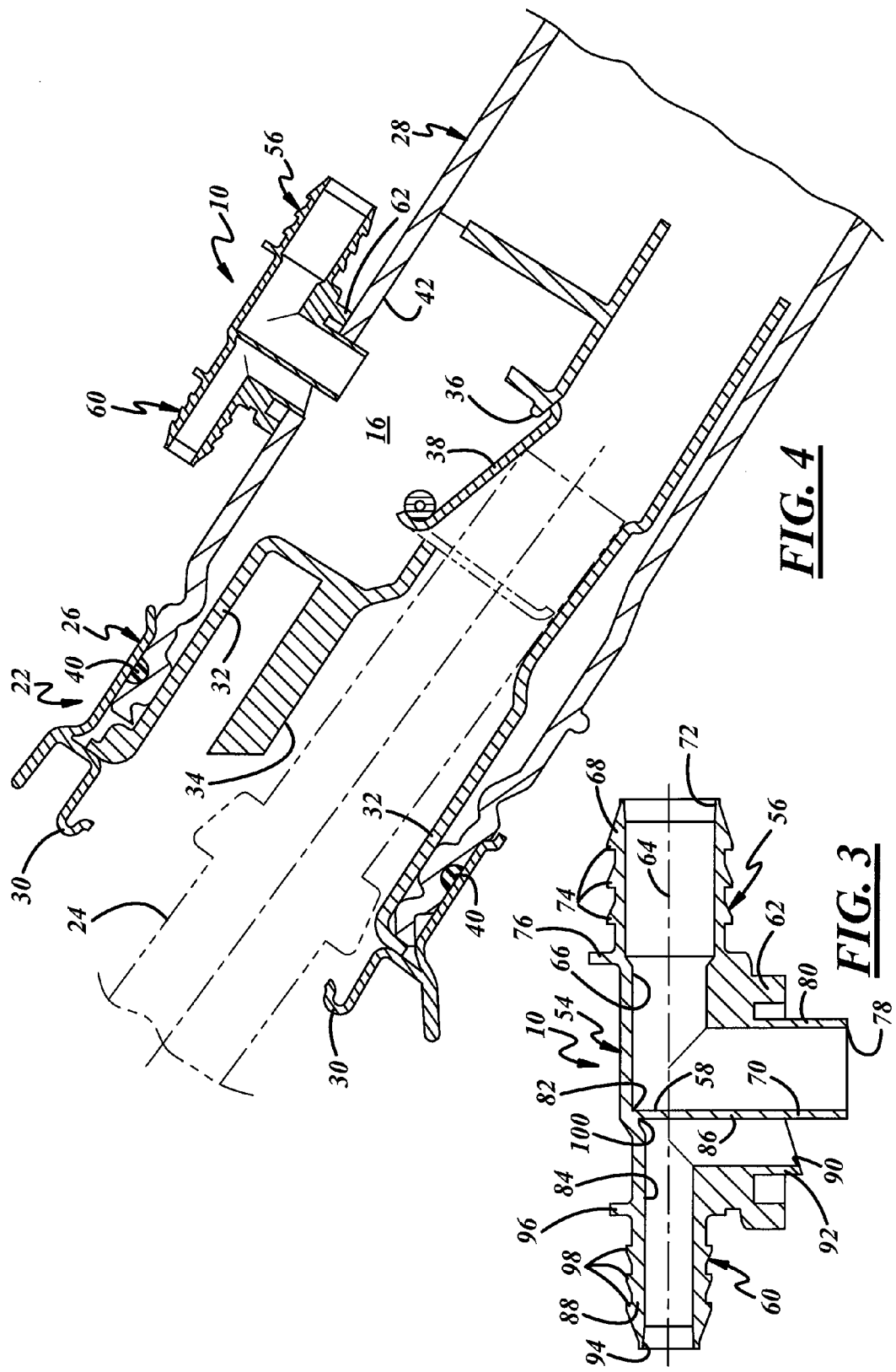

LIQUID SEPARATOR

FIELD OF THE INVENTION

The present invention relates generally to liquid separators, and more particularly to liquid separators used in fuel systems.

BACKGROUND OF THE INVENTION

Fuel systems for vehicles often include a fuel tank that holds fuel and an in-tank fuel pump for pumping fuel to an engine. Commonly, before the fuel is pumped, fuel vapor will accumulate in the fuel tank. Evaporative emission control systems have been developed to discharge the fuel vapor through a vapor tube to a vapor canister and eventually to the engine. But sometimes the fuel vapor carries liquid droplets which can negatively affect the capacity and performance of the vapor canister.

SUMMARY OF THE INVENTION

One implementation of a presently preferred liquid separator that can be used in a fuel system may include an inlet portion that communicates with a fuel tank that has an inlet pipe extending into a space. The liquid separator may also include an outlet portion that has an outlet pipe communicating with the space, and a deflector surface extending into the space farther than the outlet pipe. In operation, fluid enters the inlet portion and flows into the space and fuel vapor separates from the fluid and changes direction into the outlet pipe.

Another implementation of a presently preferred liquid separator that can be used in a vehicle fuel system may include a body having an inlet portion, an outlet portion, and a deflector surface. The inlet portion defines an inlet passage that extends from an inlet nipple and to an inlet pipe with a bend therebetween. The outlet portion defines an outlet passage that extends from an outlet pipe and to an outlet nipple with a bend therebetween. And the deflector surface constitutes an interface between the inlet portion and the outlet portion.

Another implementation of a presently preferred filler neck assembly that can be used in a vehicle fuel system may include a filler neck that is constructed to receive a refueling nozzle, a fill tube communicating with the filler neck, and a liquid separator mounted in the fill tube. The liquid separator itself includes an inlet portion that receives fluid from a fluid tube, and an outlet portion that carries separated fuel vapor to a vapor tube.

BRIEF DESCRIPTION OF THE DRAWINGS

These and other objects, features and advantages of the present invention will be apparent from the following detailed description of preferred embodiments and best mode, appended claims and accompanying drawings in which:

FIG. 1 is a schematic representation of a portion of a vehicle fuel system including one embodiment of a liquid separator;

FIG. 2 is a perspective view of the liquid separator of FIG. 1;

FIG. 3 is a sectional view of the liquid separator of FIG. 1;

FIG. 4 is a sectional view of an embodiment of a filler neck assembly that can be used in the vehicle fuel system of FIG. 1; and FIG. 5 is a sectional view of an embodiment of a vessel with the liquid separator of FIG. 1.

DETAILED DESCRIPTION OF PREFERRED EMBODIMENTS

Referring in more detail to the drawings, FIGS. 1-5 show one exemplary embodiment of a liquid separator 10 that can be used in a vehicle fuel system 12. In general, the liquid separator 10 can separate liquid and vapor from fluid that comes from a fuel tank 14. The separated liquid can be deposited in a space 16 and may eventually be directed back into the fuel tank 14, while separated vapor can be directed to a vapor canister 18.

FIG. 1 shows one embodiment of the vehicle fuel system 12 that delivers fuel to an engine 20. The vehicle fuel system 12 may include, among other components, a filler neck assembly 22 for receiving a refueling nozzle 24 (FIG. 4), the fuel tank 14 for holding fuel, the vapor canister 18 for trapping fuel vapor, and various conduits or tubes that can carry air and fuel in a gas or liquid state.

FIG. 4 shows one embodiment of the filler neck assembly 22 that includes a filler neck 26 to receive the refueling nozzle 24 (shown in phantom lines) of a refueling system (not entirely shown) and directs fuel discharged from the nozzle 24 into and through a fill tube 28 to refuel the fuel tank 14.

The filler neck 26 itself may include, among other components, a flange 30 that receives a cap (not shown) to close the fill tube 28 when fuel is not being added to the fuel tank 14, and a housing 32 that supports the filler neck 26 and is sealed to the fill tube 28. The housing 32 defines a nozzle passage 34 that is sized to receive and guide insertion of the refueling nozzle 24. The housing 32 can also define an opening 36 that can be covered by a flap 38. As shown in FIG. 4, the opening 36 can provide a passage for the separated liquid deposited from the liquid separator 10. The flap 38 can be biased closed (shown in phantom lines) to cover the nozzle passage 34 and uncover the opening 36, and alternatively the flap 38 can be opened by insertion of the refueling nozzle 24 to thus uncover the nozzle passage 34 and cover the opening 36.

Lastly for the filler neck assembly 22, the fill tube 28 carries discharged fuel from the refueling nozzle 24 and to the fuel tank 14. The fill tube 28 extends from the filler neck 26 and to the fuel tank 14, and forms a fluid-tight seal with both. The fill tube 28 may have an inner surface 42 throughout its length, and can be fitted with a one-way check valve 43 (FIG. 1) at an end of the fill tube near the fuel tank 14. Such one-way check valves will be known to those skilled in the art to permit flow in one direction, in this case discharged fuel flowing into the fuel tank 14, and prevent flow in the other direction, in this case fluid flowing out of the fuel tank 14 and into the fill tube 28.

FIG. 1 shows one embodiment of the fuel tank 14 and the vapor canister 18. The fuel tank 14 stores fuel for the vehicle and can be made of a suitable metal or plastic. As will be known to those skilled in the art, a fuel pump module 44 with an in-tank fuel pump 46 can be provided for delivering the fuel to the engine 20. The vapor canister 18 will also be known to those skilled in the art. By way of example, the vapor canister 18 can be of a known charcoal-type, or other suitable type.

The various conduits carry and direct fluid throughout the vehicle fuel system 12. The conduits can be made of a suitable metal or plastic. A fuel-feed tube 48 will be known to those skilled in the art to carry fuel from the fuel tank 14 and to the engine 20. Filters, valves, or other components (all not shown) can be incorporated in the fuel-feed tube 48 between the fuel tank 14 and the engine 20. A fluid tube 50 can carry accumulated fluid, which may include fuel vapor and liquid, from the fuel tank 14 and to the liquid separator 10. One end of the fluid tube 50 can be connected to the fuel tank 14 and the other end can be connected to the liquid separator 10. A vapor tube 52, on the other hand, can carry fuel vapor from the liquid separator 10 and to the vapor canister 18. As such, the vapor tube 52 can be connected at one end to the liquid separator 10 and at the other end to the vapor canister 18. In a similar way, the vapor tube 52 can also connect the vapor canister 18 with the engine 20. Like the fuel-feed tube 48, all of the above conduits can have incorporated filters, valves, and like components, and can have fluid-tight seals formed at their respective components.

The space 16 can accommodate fluid traveling up the fill tube 28, as well as separated fuel vapor and separated liquid from the liquid separator 10. The space 16 can be defined in a number of ways. For instance, in the filler neck assembly 22 as shown in FIG. 4, the space 16 can be defined by the filler neck assembly 22 such as by the housing 32, the inner surface 42, and the flap 38 when it is open. In FIG. 5, the space 16 can be defined by a vessel 53. These types of vessels in vehicle fuel systems can be in the form of an expansion tank or the like. In the case of FIG. 5, the vessel 53 can be an expansion tank that provides the space 16 for separated fuel vapor and separated liquid coming from the liquid separator 10. The vessel 53 can be made out of a suitable metal or plastic, and can be mounted to the fill tube 28 near the filler neck 26, or elsewhere, such as to the fuel tank 14. The vessel 53 may have a wall 55 defining an opening 57 that leads to an exit nipple 59. In either case, the separated liquid can accumulate in the space 16 to be eventually directed back to the fuel tank 14.

FIGS. 2 and 3 show the liquid separator 10 that can separate liquid and fuel vapor from fluid traveling through the fluid tube 50. As discussed, the liquid separator 10 can be located in the filler neck assembly 22, or the liquid separator 10 can be located in the vessel 53, by way of examples. The liquid separator 10 can be disposed between the fluid tube 50 and the vapor tube 52 so that it can deposit separated liquid in the adjacent space 16. The liquid separator 10 may have a body 54 with an inlet portion 56 to receive fluid, a deflector surface 58, an outlet portion 60 that can carry separated fuel vapor to the vapor tube 52, and a flange 62 that can help mount the liquid separator 10 to a particular fuel supply system component such as the fill tube 28 or the vessel 53.

The body 54 can be formed in one piece where the inlet portion 56 and the outlet portion 60 are separated by the deflector surface 58 and the portions share a center axis 64. In other embodiments, the body 54 can be formed as two distinct pieces where the inlet portion 56 is one piece and the outlet portion 60 is the other piece. The body 54 can be made out of a plastic, such as HDPE, by injection molding; or it can be made out of metal by pressure casting.

The inlet portion 56 can receive fluid coming from the fluid tube 50, and can then deposit the fluid into the space 16. The inlet portion 56 can have a circular cross-section throughout part of its length. In one embodiment, it can be located on one side of the liquid separator 10 directly opposite the outlet portion 60. The inlet portion 56 can define an inlet passage 66 that can extend through the inlet portion from an inlet nipple 68 and to an inlet pipe 70. The inlet nipple 68 can connect to the fluid tube 50 to serve as an entry of the inlet portion 56. The inlet nipple 68 can also define an opening 72 at one end and a stop 76 at another end with one or more outer barbs 74 therebetween. The barbs 74 can be used to attach the fluid tube 50, while the stop 76 provides an attachment stopping point for the fluid tube. The inlet pipe 70 serves as an exit for the fluid to the space 16. The inlet pipe 70 can define an opening 78 and can have a wall 80. The wall 80 can have a half circle cross-section with the deflector surface 58 serving as the straight line halving the circle. The wall 80 can be coextensive with the deflector surface 58.

The inlet portion 56 may further include a bend 82 to provide a somewhat abrupt change-in-direction that leads to deflector surface 58. The bend 82 can be provided anywhere along the inlet passage 66. In FIGS. 2 and 3, the bend 82 can be a single 90° bend, and in other embodiments there can be more than one bend, and the bend or bends may be equal to, or larger or smaller than 90°.

As shown, the deflector surface 58 can cause heavier liquid droplets to be separated from the fluid, thus leaving fuel vapor. The deflector surface 58 can be a planar surface extending from the bend 82 and to the opening 78. The deflector surface 58 can be located adjacent the bend 82 where it can lie at a 90° angle with the center axis 64, and can constitute an interface between the inlet portion 56 and the outlet portion 60.

Still referring to FIGS. 2 and 3, the outlet portion 60 can carry separated fuel vapor and refueling fuel vapor from the space 16 and to the vapor tube 52. The outlet portion 60 can have a circular cross-section throughout part of its length that is smaller in diameter than a similar cross-section in the inlet portion 56. The outlet portion 60 can define an outlet passage 84 that can extend through the outlet portion 60 from an outlet pipe 86 and to an outlet nipple 88. The outlet pipe 86 serves as an entry for the separated fuel vapor and refueling fuel vapor into the outlet portion 60. The outlet pipe 86 can define an opening 90 and can have a wall 92. The wall 92 can have a half circle cross-section like the wall 80 with the deflector surface 58 serving as the straight line halving the circle. The wall 92 can have a shorter length than the wall 80; in other words, the wall 92 does not extend as far into the vapor space 16 as the wall 80. The outlet nipple 88 can connect to the vapor tube 52 to serve as an exit out of the outlet portion 60. The outlet nipple 88 can also define an opening 94 at one end and a stop 96 at another end with one or more outer barbs 98 therebetween. The barbs 98 can be used to attach the vapor tube 52, while the stop 96 provides an attachment stopping point for the vapor tube.

The outlet portion 60 can further include a bend 100 that, like the bend 82, can also be a single 90° bend, and in other embodiments there can be more than one bend, and the bend or bends may be equal to, or larger or smaller than 90°. The bend 100 can be provided anywhere along the outlet portion 60. Still in other embodiments the bend 100 need not be provided whereby the outlet portion 60 could be unidirectional, for instance in one direction at a 90° angle with the center axis 64. In yet another embodiment, both the inlet portion 56 and the outlet portion 60 can be unidirectional without a bend, whereby their respective passages would lie parallel to each other.

The flange 62 can be used to mount the liquid separator 10 to the particular fuel system component. As shown in FIGS. 2 and 3, the flange 62 has a ring-like shape to surround the periphery of both the inlet pipe 70 and the outlet pipe 86.

To install the liquid separator 10, it can be mounted on the particular fuel system component by welding, fastening, heat-staking, gluing, or the like. In the filler neck assembly 22 as shown in FIG. 4, the liquid separator 10 can be welded to the fill tube 28 breaching the inner surface 42. The flange 62 can support the liquid separator 10 on the fill tube 28 by bearing against an outer surface of the fill tube. And although aligned with an imaginary center axis (not shown) of the filler neck assembly 22, the liquid separator can be positioned unaligned on the filler neck assembly 22 such that the center axis 64 would lie at an angle with the imaginary center axis of the filler neck assembly when viewed from above the liquid separator 10. Likewise, in the vessel 53 as shown in FIG. 5, the liquid separator 10 can be welded to the vessel 53 completely through the wall 55.

When used in the filler neck assembly 22 as shown in FIG. 4, fluid which may include liquid droplets can be carried through the fluid tube 50 and into the inlet portion 56. The fluid enters the inlet passage 66 through the inlet nipple 68 and flows into the deflector surface 58. The deflector surface 58 causes a change-in-direction such that the inertia of the heavier liquid droplets separates them from fuel vapor or other gases like air. In other embodiments, such as the one mentioned where the respective passages 66 and 84 are parallel without a bend, gravity can cause the separation. For example, the heavier liquid droplets may continue flowing into the space 16 while lighter fuel vapor travels around the inlet pipe 70 and into the outlet portion 60. Referring back to the embodiment of FIG. 4, both the separated fuel vapor and the separated liquid can travel out of the inlet portion 56 through the inlet pipe 70 to be deposited in the space 16. With the help of gravity, the separated liquid collects in the space 16 adjacent the opening 36, while the separated fuel vapor remains adjacent the inner surface 42. Then the separated liquid can travel past the opening 36, down the nozzle passage 34, through the fill tube 28, and to the fuel tank 14. The separated fuel vapor, on the other hand, can exit the space 16 through the outlet portion 60. The separated fuel vapor enters the outlet passage 84 through the outlet pipe 86, travels around the bend 100, and exits out the outlet nipple 88 into the vapor tube 52. Furthermore, fuel vapor created when refueling the fuel tank 14 can travel up the fill tube 28 and exit through the outlet portion 60 the same way as the separated fuel vapor.

When used in the vessel 53 as shown in FIG. 5, fluid which may include liquid droplets can be carried through the fluid tube 50, into the inlet portion 56, and similarly depositing the separated fuel vapor and the separated liquid in the space 16. Here though, the separated liquid can travel past the opening 57, down the exit nipple 59, and into a conduit (not shown). The conduit, in turn, can communicate with the fill tube 28 or directly with the fuel tank 14. In either case, the separated liquid travels eventually to the fuel tank 14. The separated fuel vapor can exit the space 16 through the outlet portion 60 in a similar way as previously described into the vapor tube 52.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A liquid separator used in a fuel system with a fuel tank and a vapor storage canister, comprising:
    a vessel defining at least in part a space separate from the fuel tank and communicating with the fuel tank; and
    a separator body including:
    an inlet portion for communication with a fuel tank and having an inlet pipe extending into the space, the inlet pipe defining at least part of an inlet passage;
    an outlet portion for communication with a vapor storage canister and having an outlet pipe communicating with the space and leading from the space; and
    a deflector surface disposed between the inlet pipe and the outlet pipe, the deflector surface extending into the space at least as far as the outlet pipe;
    wherein fluid enters the inlet portion and flows into the space, and fuel vapor separates from the fluid by changing direction and exits the space through the outlet pipe.

2. The liquid separator of claim 1 wherein the liquid separator is one piece and further comprises a flange that helps mount the liquid separator on the vessel and that surrounds the periphery of both the inlet pipe and the outlet pipe.

3. The liquid separator of claim 1 wherein the inlet portion comprises an approximate 90° bend defined adjacent the deflector surface.

4. The liquid separator of claim 3 wherein the outlet portion comprises an approximate 90° bend adjacent the outlet pipe.

5. A liquid separator used in a fuel system with a fuel tank having a fill tube, comprising:
    a space defined inside a fill tube and at least partly thereby;
    an inlet portion communicating with a fuel tank and having an inlet pipe extending into the space, the inlet pipe defining at least part of an inlet passage;
    an outlet portion having an outlet pipe communicating with the space and leading from the space; and
    a deflector surface disposed between the inlet pipe and the outlet pipe, the deflector surface extending into the space farther than the outlet pipe;
    wherein fluid enters the inlet portion and flows into the space, and fuel vapor separates from the fluid by changing direction and exits the space out the outlet pipe.

6. The liquid separator of claim 1 wherein the deflector surface is generally planar and constitutes an interface between the inlet passage and the outlet passage.

7. The liquid separator of claim 1 wherein the inlet portion and the outlet portion are both part of a one piece body where the two portions are separated primarily by the deflector surface.

8. The liquid separator of claim 7 wherein a section of the inlet passage shares a center axis with a section of the outlet passage.

9. A liquid separator used in a vehicle fuel system with a fuel tank having a fuel fill tube communicating with the fuel tank and defining at least in part a space , comprising:
    a body configured for mounting on the fill tube and including:
    an inlet portion defining an inlet passage extending from an inlet nipple and to an inlet pipe opening into the space and having an approximately 90° bend therebetween, the inlet pipe having a wall;
    an outlet portion defining an outlet passage extending from an outlet pipe opening into the space to an outlet nipple and having an approximately 90° bend therebetween, the outlet pipe having a wall that is shorter in length than the wall of the inlet pipe; and
    a deflector surface constituting an interface between the inlet portion and the outlet portion.

10. The liquid separator of claim 9 further comprising a flange that helps mount the liquid separator to a fuel system component, the flange surrounding the periphery of both of the inlet dip pipe and the outlet dip pipe.

11. The liquid separator of claim 9 wherein both the inlet nipple and the outlet nipple have outer barbs for receiving a respective conduit.

12. The liquid separator of claim 9 wherein the section of the inlet passage defined by the inlet nipple shares a center axis with the section of the outlet passage defined by the outlet nipple.

13. The liquid separator of claim 9 wherein the inlet passage has a circular cross-section throughout part of its length that is larger than a similar circular cross-section of the outlet passage.

14. A filler neck assembly for use in a vehicle fuel system, comprising:
   a filler neck constructed to receive a refueling nozzle;
   a fill tube communicating with the filler neck and at least partly defining a space; and
   a liquid separator mounted in the fill tube adjacent the space, the liquid separator comprising:
   an inlet portion that receives fluid from a fluid tube and that deposits separated liquid into the space; and
   an outlet portion that carries separated fuel vapor from the space and to a vapor tube.

15. The filler neck assembly of claim 14 wherein the fill tube includes a one-way check valve positioned at an end of the fill tube near a fuel tank to prevent fluid in the fuel tank from going into the fill tube.

16. The filler neck assembly of claim 14 wherein the liquid separator is mounted in the fill tube at a position above the end of the refueling nozzle when the refueling nozzle is inserted fully in the filler neck.

17. The filler neck assembly of claim 14 wherein the filler neck includes a flap that is biased closed and that opens when the refueling nozzle is inserted in the filler neck, and wherein the space is located adjacent the flap such that when the flap is open the flap generally covers the space from the filler neck, and when the flap is closed the separated liquid can be deposited into the filler neck and into the fill tube.

18. The filler neck assembly of claim 14 wherein the liquid separator further includes a deflector surface constituting an interface between the inlet portion and the outlet portion, and also including a flange that helps mount the liquid separator in the fill tube.

19. The filler neck assembly of claim 18 wherein the inlet portion of the liquid separator defines an inlet passage that extends from an inlet nipple connected to the fluid tube and extends to an inlet pipe leading to the space, and wherein the outlet portion defines an outlet passage that extends from an outlet pipe leading from the space and extends to an outlet nipple connected to the vapor tube.

20. The filler neck assembly of claim 14 wherein the fluid tube communicates with a fuel tank, and the vapor tube communicates with a vapor canister.

* * * * *